US012671781B2

(12) United States Patent
Zhou et al.

(10) Patent No.: US 12,671,781 B2
(45) Date of Patent: Jun. 30, 2026

(54) COLOR NOISE REDUCTION BASED ON GUIDED FILTER USING LUMINANCE INFORMATION

(71) Applicant: CISTA SYSTEM CORP., Grand Cayman (KY)

(72) Inventors: Hong Zhou, Shanghai (CN); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 216 days.

(21) Appl. No.: 18/370,594

(22) Filed: Sep. 20, 2023

(65) Prior Publication Data

US 2025/0097367 A1 Mar. 20, 2025

(51) Int. Cl.
*G06T 5/70* (2024.01)
*G06T 5/20* (2006.01)
*G06T 7/13* (2017.01)
*G06V 10/56* (2022.01)
*G06V 10/60* (2022.01)
*H04N 1/60* (2006.01)

(52) U.S. Cl.
CPC ............. *H04N 1/6016* (2013.01); *G06T 5/20* (2013.01); *G06T 5/70* (2024.01); *G06T 7/13* (2017.01); *G06V 10/56* (2022.01); *G06V 10/60* (2022.01); *G06T 2207/10024* (2013.01)

(58) Field of Classification Search
CPC ........... H04N 1/6016; G06T 5/20; G06T 5/70; G06T 7/13; G06T 2207/10024; G06V 10/56; G06V 10/60

USPC .......................................................... 382/167
See application file for complete search history.

(56) References Cited

U.S. PATENT DOCUMENTS

| | | | |
|---|---|---|---|
| 9,715,720 B1 * | 7/2017 | Li | G06T 5/70 |
| 9,894,298 B1 * | 2/2018 | Solh | G06T 5/40 |
| 2007/0216781 A1 * | 9/2007 | Miyanohara | H04N 21/4223 348/E5.065 |

(Continued)

OTHER PUBLICATIONS

C. Tomasi et al., "Bilateral Filtering for Gray and Color Images", Proceedings of the 1998 IEEE International Conference on Computer Vision, Bombay, India, Jan. 7, 1998, pp. 839-846.

(Continued)

*Primary Examiner* — Ali Bayat
(74) *Attorney, Agent, or Firm* — Sheppard Mullin Richter & Hampton LLP

(57) ABSTRACT

This application describes method and apparatus for color noise reduction to enhance the quality of color images. An example method first takes a color image as its input and converts it into a Luminance-Chrominance color space, resulting in an YUV image. This YUV representation consists of a Y-channel (Luminance information), which encapsulates the luminance information responsible for the image's brightness, and UV-channels, which represent the chrominance information responsible for the color information. Then a guided filter is created using the Y-channel of the YUV image. The guided filter acts as a reference and assists in refining the subsequent noise reduction steps. With the guided filter in place, the method performs color noise reduction in the UV-channels of the YUV image, where the color noise is primarily present, resulting in smoother and cleaner color values.

18 Claims, 7 Drawing Sheets

Luminance only     Chrominance only     Full color image

(56) References Cited

U.S. PATENT DOCUMENTS

| | | | |
|---|---|---|---|
| 2009/0285480 A1* | 11/2009 | Bennett | G06T 5/70 |
| | | | 382/167 |
| 2010/0208066 A1* | 8/2010 | Yabumoto | H04N 23/683 |
| | | | 348/143 |
| 2016/0063711 A1* | 3/2016 | Ogasawara | H04N 23/11 |
| | | | 348/164 |
| 2019/0043209 A1* | 2/2019 | Nishimura | H04N 23/60 |
| 2021/0321142 A1* | 10/2021 | Lin | H04N 19/40 |
| 2023/0269489 A1* | 8/2023 | Gandhi | H04N 23/951 |

OTHER PUBLICATIONS

Kaiming He et al., "Guided Image Filtering", European Conference on Computer Vision, ECCV 2010, Part I, LNCS 6311, 2010, pp. 1-14.

* cited by examiner

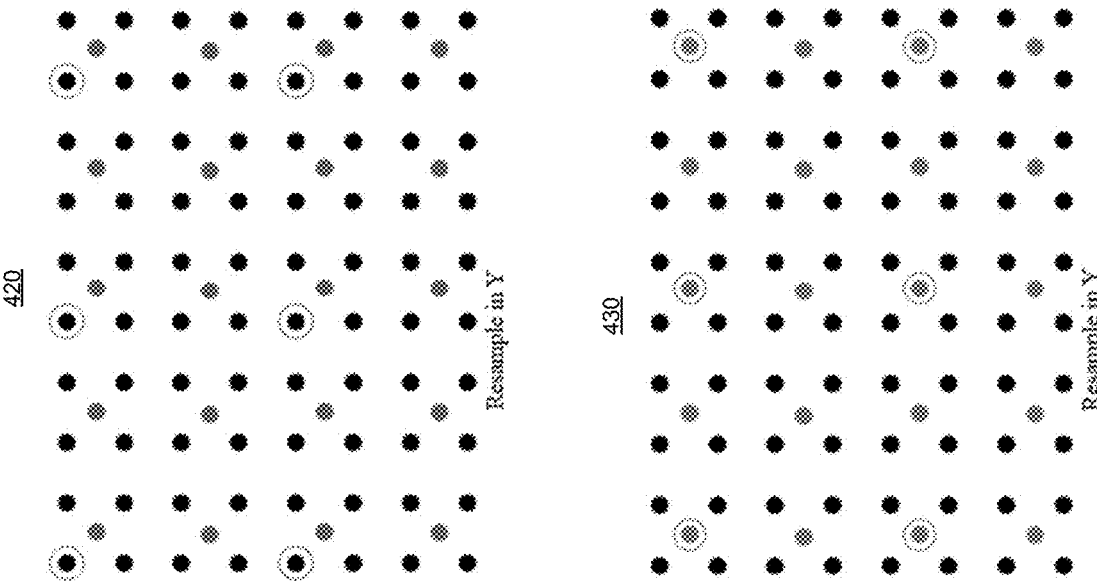
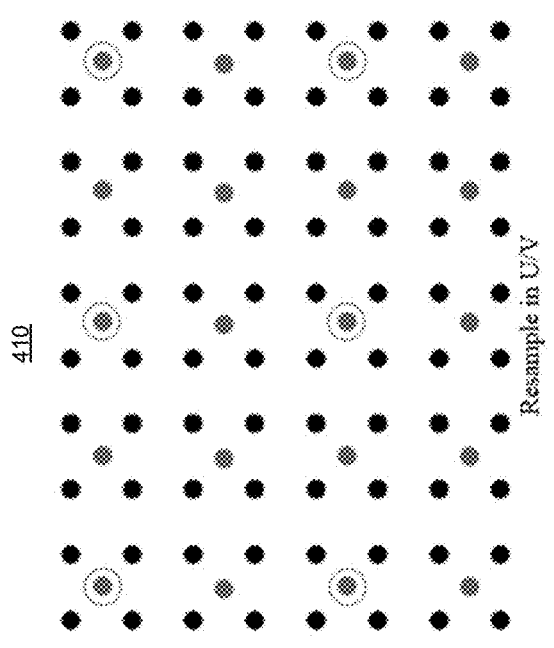
FIG. 4

500

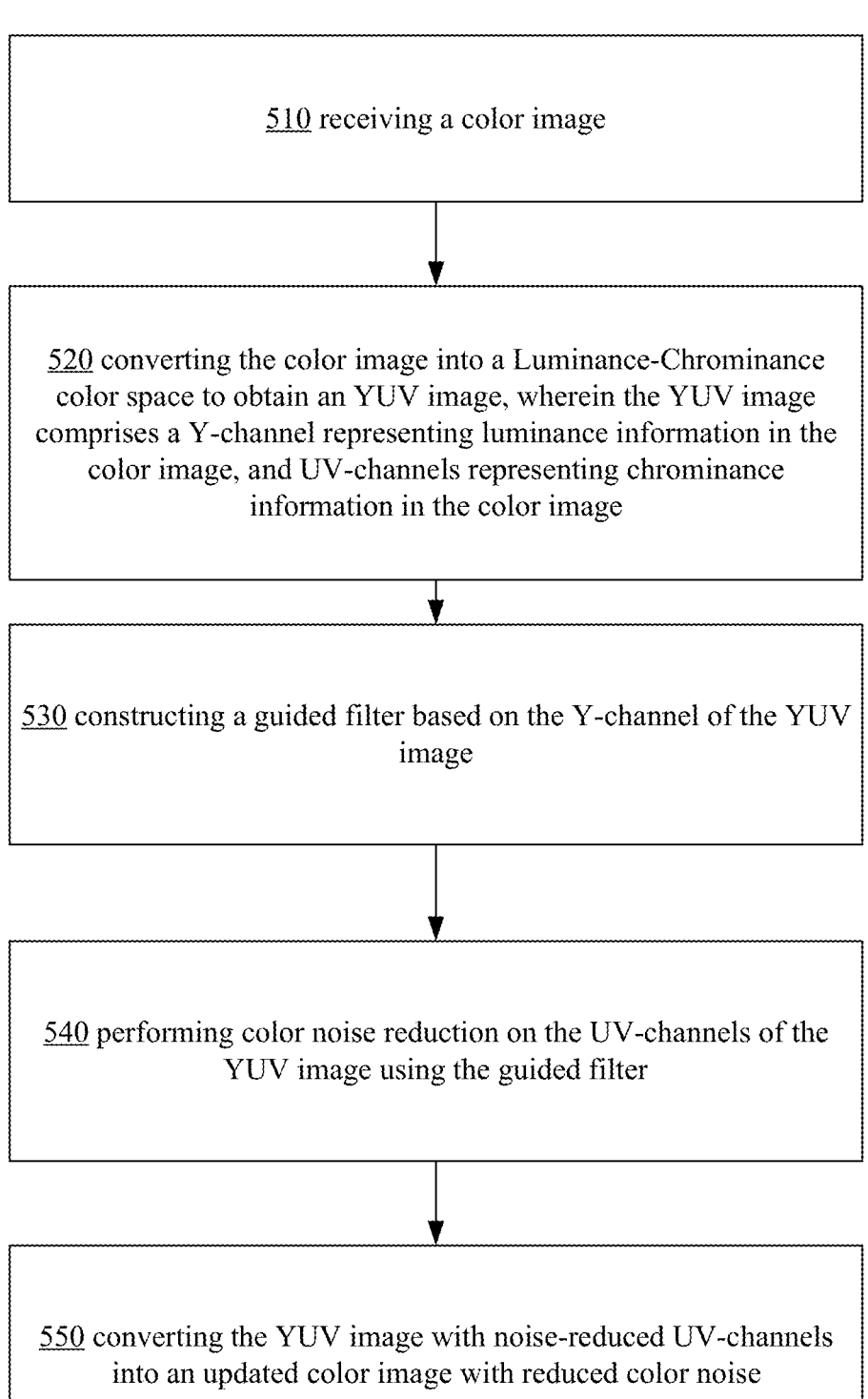

510 receiving a color image 520 converting the color image into a Luminance-Chrominance color space to obtain an YUV image, wherein the YUV image comprises a Y-channel representing luminance information in the color image, and UV-channels representing chrominance information in the color image 530 constructing a guided filter based on the Y-channel of the YUV image 540 performing color noise reduction on the UV-channels of the YUV image using the guided filter 550 converting the YUV image with noise-reduced UV-channels into an updated color image with reduced color noise

FIG. 5

COLOR NOISE REDUCTION BASED ON GUIDED FILTER USING LUMINANCE INFORMATION

TECHNICAL FIELD

The disclosure relates generally to apparatus, system, and method for color noise reduction in image processing.

BACKGROUND

Color noise plays a crucial role in assessing the quality of an image. When it comes to combating noise, the Guided Image Filter has gained significant popularity as a renowned and effective method. Compared to other approaches like the classic bilateral filter, the Guided Image Filter has proven to be more successful.

The Guided filter's widespread use and effectiveness are well-known, finding applications in various fields. However, in the context of noise reduction, it heavily relies on guided images (also called guided filters). Often, obtaining sufficient references or prior ground truth can be challenging, leading many guided filters to use the noise image itself as a guide.

In this context, this application takes a creative approach by utilizing the luminance component information as the guide image to tackle color noise in the chrominance component. The results have been remarkably promising, demonstrating the efficacy of this innovative technique.

SUMMARY

Various embodiments of this specification may include hardware circuits, systems, and methods for color noise reduction in image processing using Luminance information based guided filters.

In some aspects, the techniques described herein relate to a computer-implemented method, including: receiving a color image; converting the color image into a Luminance-Chrominance color space to obtain an YUV image, wherein the YUV image includes a Y-channel representing luminance information in the color image, and UV-channels representing chrominance information in the color image; constructing a guided filter based on the Y-channel of the YUV image; performing color noise reduction on the UV-channels of the YUV image using the guided filter; and converting the YUV image with noise-reduced UV-channels into an updated color image with reduced color noise.

In some aspects, the color image includes an RGB (Red, Green, Blue) image, each pixel in the color image including a Red value, a Green value, and a Blue value, and the converting the color image to obtain the YUV image includes: for a pixel in the color image, computing: a Y-channel value for the pixel based on the Red value, the Green value, and the Blue value, a U-channel value based on the Blue value and the Y-channel value, and a V-channel value based on the Red value and the Y-channel value; and obtaining the YUV image based on the Y-channel value, the U-channel value, and the V-channel value of the pixel.

In some aspects, the Y-channel value represents brightness information of the pixel, and the U-channel value and the V-channel value represent color difference signals of the pixel.

In some aspects, the constructing the guided filter based on the Y-channel of the YUV image includes: constructing a guided image based on the Y-channel of the YUV image; and wherein the performing color noise reduction on the UV-channels of the YUV image using the guided filter includes: defining a filtering window; for a pixel of the YUV image, computing local Y-channel statistics of the pixel based on pixel values within the filtering window centered at the pixel; and computing a pair of filtering weights for the pixel based on the local Y-channel statistics of the pixel and UV-channel values of the pixel, wherein the pair of filtering weights are used to perform color noise reduction on the UV-channels of the YUV image.

In some aspects, the pair of filtering weights includes a first filtering weight and a second filtering weight, and the second filtering weight is a linear function of the first filtering weight.

In some aspects, the constructing the guided image based on the Y-channel of the YUV image includes: using the Y-channel of the YUV image as the guided image.

In some aspects, the constructing the guided image based on the Y-channel of the YUV image includes: performing brightness noise reduction on the Y-channel of the YUV image to obtain an updated Y-channel representation; and using the updated Y-channel representation as the guided image.

In some aspects, the constructing the guided image based on the Y-channel of the YUV image includes: performing edge detection on the Y-channel of the YUV image to obtain an edge map; and using the edge map as the guided image.

In some aspects, the techniques described herein relate to a computer-implemented method, further including: performing edge detection on the Y-channel of the YUV image to obtain an edge map, and wherein a first filtering weight of the pair of filtering weights includes a color noise reduction strength parameter, and the color noise reduction strength parameter is adjustable for individual pixels based on the edge map.

In some aspects, the method further includes adjusting the noise reduction strength parameter for a pixel based on whether the pixel is within a flat area or an area with an edge.

In some aspects, the performing color noise reduction on the UV-channels of the YUV image includes: obtaining filtered pixels by applying the pair of filtering weights to each pixel in the YUV image.

In some aspects, the techniques described herein relate to a system including one or more processors and one or more non-transitory computer-readable memories coupled to the one or more processors and configured with instructions executable by the one or more processors to cause the system to perform operations including: receiving a color image; converting the color image into a Luminance-Chrominance color space to obtain an YUV image, wherein the YUV image includes a Y-channel representing luminance information in the color image, and UV-channels representing chrominance information in the color image; constructing a guided filter based on the Y-channel of the YUV image; performing color noise reduction on the UV-channels of the YUV image using the guided filter; and converting the YUV image with noise-reduced UV-channels into an updated color image with reduced color noise.

In some aspects, the techniques described herein relate to a non-transitory computer-readable storage medium configured with instructions executable by one or more processors to cause the one or more processors to perform operations including: receiving a color image; converting the color image into a Luminance-Chrominance color space to obtain an YUV image, wherein the YUV image includes a Y-channel representing luminance information in the color image, and UV-channels representing chrominance information in the color image; constructing a guided filter based on the Y-channel of the YUV image; performing color noise reduction on the UV-channels of the YUV image using the guided filter; and converting the YUV image with noise-reduced UV-channels into an updated color image with reduced color noise.

These and other features of the systems, methods, and hardware devices disclosed, and the methods of operation and functions of the related elements of structure and the combination of parts and economics of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 4 illustrates an exemplary sampling method for facilitating hardware implementation, according to some embodiments of this specification.

FIG. 5 illustrates an exemplary method for reducing color noise using Luminance information based guided image, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

Figure 1A:
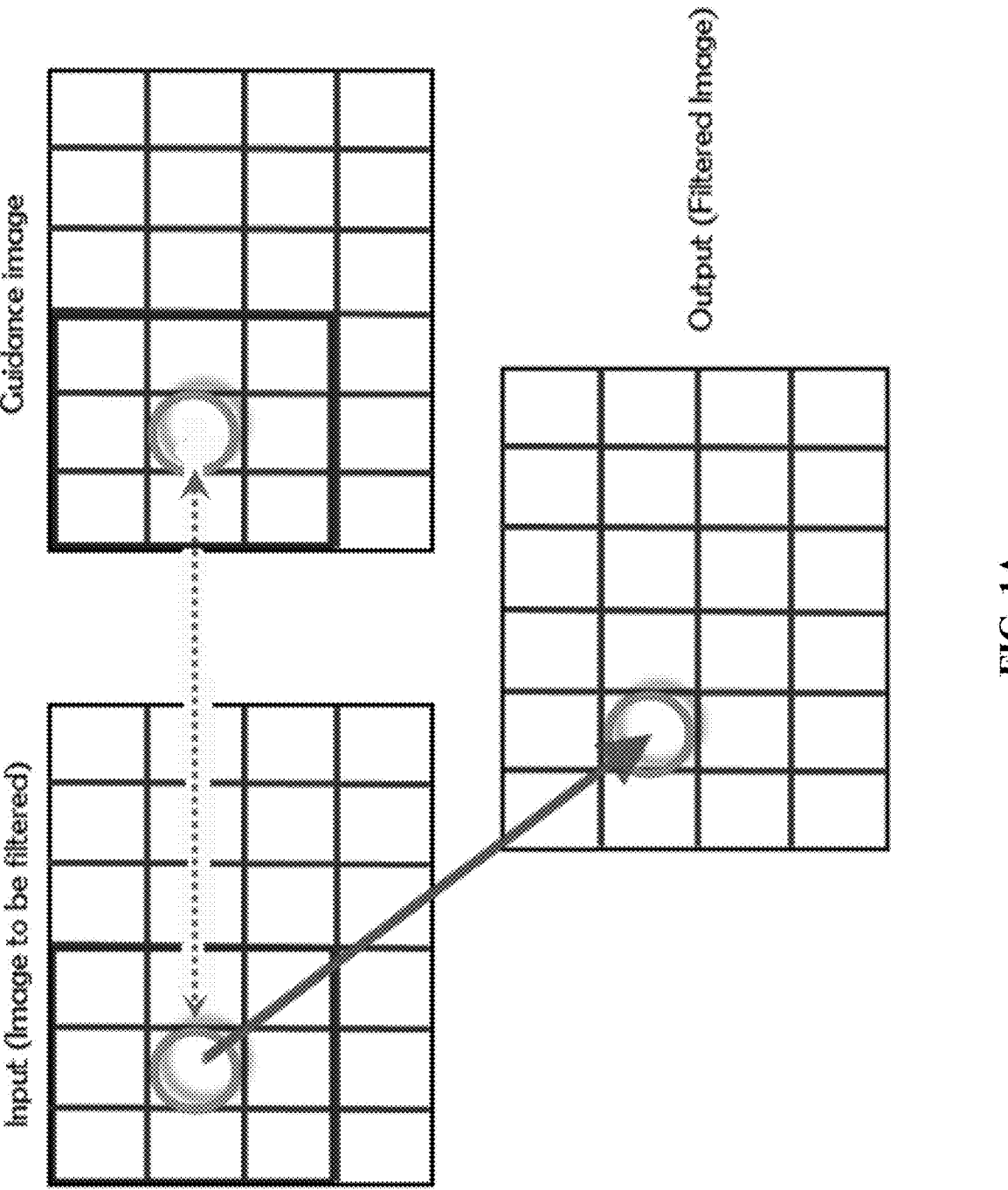
FIG. 1A illustrates the concept of guided image filtering.

FIG. 1A illustrates the concept of guided image filtering. Guided image processing is a powerful technique in image denoising, aimed at enhancing image quality by reducing noise while preserving vital image details. This technique relies on the concept of using a "guide image" and a "target image." The guide image is typically a low-noise or noise-free version of the target image, while the target image is the one contaminated with noise. As shown in FIG. 1A, the input includes an image to be filtered or denoised, and the guidance image can be the input image itself, another version of the input image, or a different image related to the input. This guidance image provides information about the local structures and edges present in the image. The filter then uses this guidance information to perform noise reduction and generate the output image, i.e., the filtered image.

The key idea behind guided image processing is to exploit the structural similarities between the guide image and the target image. By doing so, the denoising algorithm can use the guide image as a reference to preserve important image structures while effectively suppressing noise in the target image.

The guided filter is particularly effective in scenarios where traditional filters like Gaussian filters may blur edges or important details while reducing noise. It is commonly used in applications such as image denoising, HDR imaging, dehazing, and image enhancement. The guided filter offers a balance between noise reduction and preserving important image features, making it a valuable tool in image processing.

However, as explained in the background section, Color noise reduction is unique and presents its own set of challenges when using guided image processing compared to other types of noise reduction due to several reasons, such as the multichannel natura of color images and correlation between channels (e.g., how to ensure the noise reduction is effective across all color channels), non-uniform noise distribution, and most importantly, the guided image selection (e.g., unlike grayscale images, color images have additional complexities, and finding a guide image that accurately represents the noise characteristics of the target image can be more difficult).

Figure 1B:
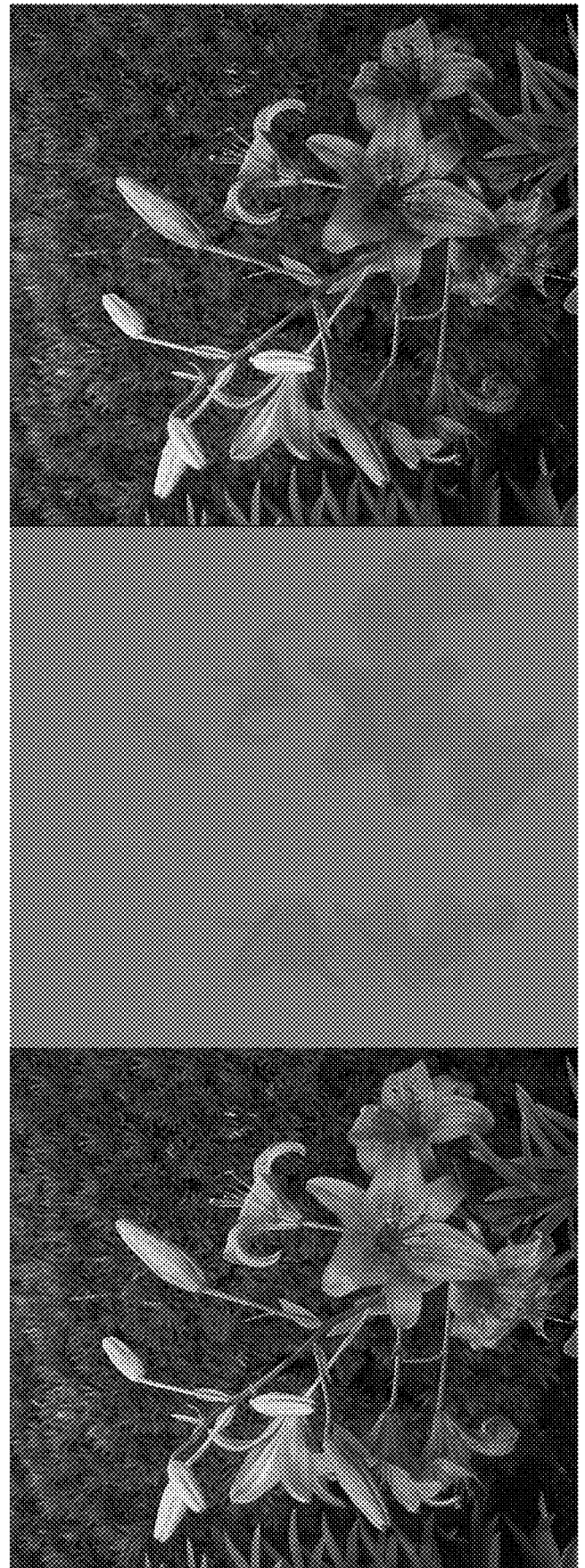
FIG. 1B illustrates Luminance-Chrominance color space of a color image.

FIG. 1B illustrates a Luminance-Chrominance color space of a color image. Luminance information and chrominance components are terms commonly used in color systems and image/video processing to describe different aspects of color representation. In FIG. 1B, the full color image may be converted into a Luminance-Chrominance color space, which includes a Luminance channel and a Chrominance channel.

Luminance channel refers to the brightness or intensity of light in the image or video. It represents the black and white component of an image, conveying information about the overall lightness or darkness of each pixel. Luminance is often associated with the perception of grayscale or monochromatic images.

Chrominance channel, on the other hand, refers to the color information in the image or video. It represents the variations in hue and saturation, which are responsible for the different colors we perceive. Chrominance is typically represented by two color difference signals, such as the red-green (R-Y) and blue-yellow (B-Y) components. These color difference signals carry the information necessary to recreate the full range of colors when combined with the luminance component.

Figure 2:
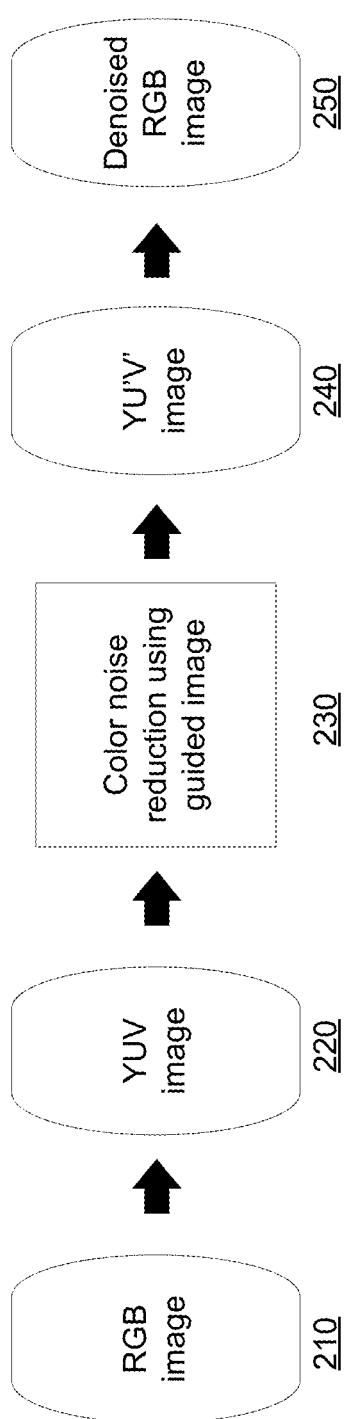
FIG. 2 illustrates exemplary process for reducing color noise using Luminance information based guided filter, according to some embodiments of this specification.

FIG. 2 illustrates exemplary process for reducing color noise using Luminance information based guided image, according to some embodiments of this specification. The steps illustrated in FIG. 2 are representative steps, and the process may include fewer, additional, or alternative steps depending on the implementation.

In some embodiments, the process may start with receiving a color image at step 210. The color image may include an image captured by a camera or image sensor, or a frame from a video. The color image may include a RGB (Red, Green, and Blue channels) image, in which each pixel in the color image includes a Red value, a Green value, and a Blue value.

The input color image may then be converted into a Luminance-Chrominance color space to obtain an YUV image at step 220. The YUV image includes a Y-channel representing luminance components in the color image, and UV-channels representing chrominance components in the color image. In some embodiments, the conversion from the color image into YUV image may be performed as part of image and video compression algorithms, such as JPEG and MPEG. In these compression algorithms, the Y and UV channels are compressed differently. For instance, the Y channel may have a higher compression rate compared to the UV channels, as human vision is more sensitive to changes in brightness than color.

The converting a color image to obtain the YUV image may be implemented in various ways. In some embodiments, for each pixel in the color image, the YUV values are computed as follows: firstly, a Y-channel value is calculated for the pixel using the Red value, Green value, and Blue value of that pixel. This Y-channel value represents the luminance component, which determines the brightness of the pixel in the color image. Next, a U-channel value is derived based on the Blue value and the previously calculated luminance value. The U-channel represents the chrominance component responsible for the blue and yellow color information. Similarly, a V-channel value is obtained using the Red value and the previously calculated luminance value. The V-channel represents the chrominance component responsible for the red and cyan color information. With the Y-channel, U-channel, and V-channel values calculated for the pixel, one pixel of the YUV image is formed by combining these channel values. This process is repeated for each pixel in the color image, resulting in the YUV image that preserves the luminance and chrominance components, effectively representing the color image in the YUV color space.

The YUV image then provides sufficient information for constructing a guided image/filter and performing color noise reduction at step 230. In some embodiments, the guided filter may be constructed based on the Y-channel of the YUV image. This step is discussed in more details in FIG. 3. Here, the term "guided filter" is preferred over "guided image" simply because the Y-channel information is not a complete image, but a filter with part of the information in the image.

After the color noise reduction using the guided filter constructed from the Y-channel of the YUV image, a YU'V' image may be obtained at step 230. The U'V' indicate that the chrominance information of the YUV images are updated, e.g., smoothened or denoised.

In some embodiments, the YU'V' image may then be converted back to a denoised color image at step 250 for subsequent image consumption. The conversion process is a reverse of the above-described conversion from the RGB image to YUV image.

Figure 3:
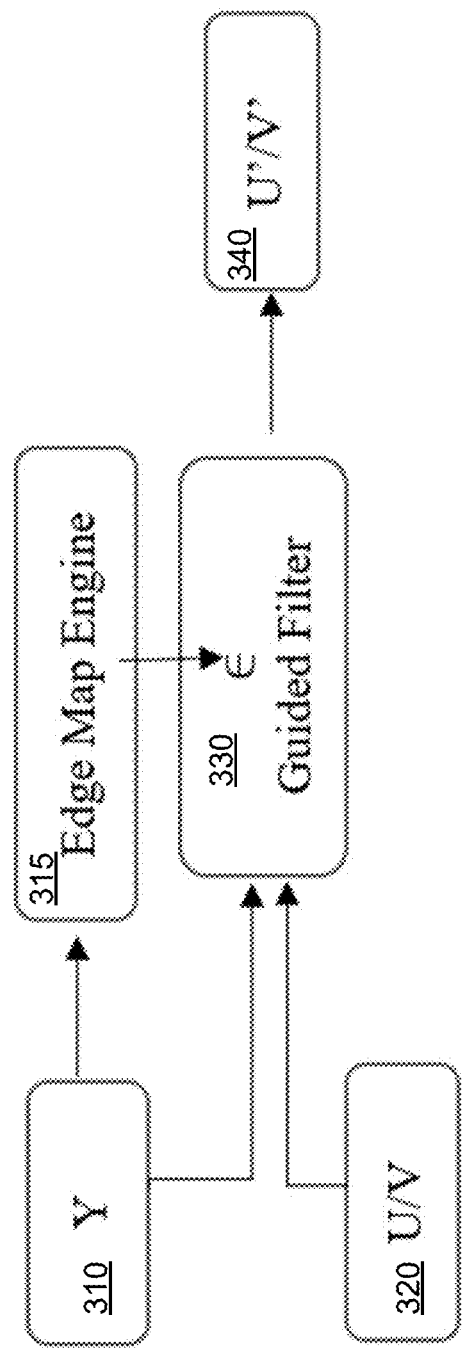
FIG. 3 illustrates an exemplary implementation of reducing color noise using Luminance information based guided filter, according to some embodiments of this specification.

FIG. 3 illustrates an exemplary implementation of reducing color noise using Luminance information based guided filter, according to some embodiments of this specification. Some of the components illustrated in FIG. 3 is optional, and may be implemented for implementation considerations.

After a color image being converted into the Luminance-Chrominance color space, the resulting YUV image may include a Y-channel Luminance information 310 and U/V channels of Chrominance information 320. In some embodiments, the Y-channel 310 of the YUV image may be directly used as the guided filter 330 for performing color noise reduction in the U/V channels.

With the Y-channel 310 as the guided filter 330, each pixel in the UV-channels may go through color noise reduction to improve the visual quality of image. For example, a filtering window may first be determined. The size of the filtering window determines the local neighborhood around each pixel for filtering. When performing color noise reduction on a pixel in the image, local Y-channel statistics of the pixel may be computed based on pixel values within the filtering window centered at the pixel. Then a pair of filtering weights for the pixel may be computed based on the local Y-channel statistics of the pixel and UV-channel values of the pixel, wherein the pair of filtering weights are used to perform color noise reduction on the UV-channels of the YUV image.

The above-described process may involve algorithms represented by the following formulas $$\alpha_k = \frac{\frac{1}{|\omega|}\sum_{i\in\omega_k} I_{i}p_i - \mu_i \overline{\mathcal{P}}_k}{\sigma_k^2 + \epsilon} \qquad (1)$$

$$b_k = \overline{\mathcal{P}}_k - \alpha_k \mu_k$$

$$\overline{\alpha}_i = \frac{1}{|\omega|}\sum_{k:i\in\omega_k} \alpha_k, \qquad (2)$$

$$\overline{b}_i = \frac{1}{|\omega|}\sum_{k:i\in\omega_k} b_k$$

where I is the guide filter (e.g., the luminance channel), p is the noise image (chrominance channels), $w_k$ is the filtering window, |w| is the number of pixels in $w_k$, $a_k$ and $b_k$ are linear coefficients assumed to be constant in $w_k$, $\mu_k$ and $\sigma_k$ are the mean and variance of I, $$\overline{\mathcal{P}}_k = \frac{1}{|\omega|}\sum_{i\in\omega_k} \mathcal{P}_i$$

is the mean of p in $w_k$, $\epsilon$ is the denoising strength control parameter preventing $a_k$ from being too large. As shown, the two linear coefficients, also called filtering weights, includes a first filtering weight ax and a second filtering weight $b_k$, and the second filtering weight $b_k$ is a linear function of the first filtering weight $a_k$.

Formula 2 shows average of a and b in the adjacent window, and the final filtered result is computed by:

$$q = \overline{a}*I + \overline{b} \qquad (3)$$

where q is the output denoised image (filtered chrominance channels). That is, the pair of filtering weights are applied to each pixel in the YUV image to reduce color noises in the UV-channels of the YUV image, and generate filtered pixels with reduced color noises.

In some embodiments, the Y-channel of the YUV image may first go through a brightness noise reduction to obtain an updated Y-channel representation, which may then be used as the guided filter.

In some embodiments, the Y-channel 310 may go first through an edge map engine 315 in which edge information is extracted from the Y-channel of the image. The extracted edge information may be used as strength control (e.g., the color noise reduction strength parameter $\epsilon$ in above formula 1) of color noise reduction from UV components. This can further prevent color fading and crosstalk near the edges and do heavier color noise reduction on flat area. This present disclosure not limit methods of how to extract edge information from luminance component. For example, the edge detection process may generate an edge map, which may be used as the guided filter. The edge map may be used to adjust the noise reduction strength parameter ϵ in above formula 1 for a given pixel based on whether the pixel is within a flat area or an area with an edge.

After the color noise reduction is performed in the UV channels of the image, the UV channels may be improved as U'V' channels 340. Then the Y-channel and the U'V' channels 340 may be converted back to an RGB image for subsequent processes, e.g., user consumption.

FIG. 4 illustrates an exemplary sampling method for facilitating hardware implementation, according to some embodiments of this specification. The process described in this disclosure may be applied to not only general image processing, but also real-time color noise reduction in use cases requiring high throughput and low latency. Therefore, in some embodiments, the Y-channel and/or the UV-channel may go through some downsampling processes to reduce the amount of data to be processed. Empirical evidence indicates that downsampling does not compromise noise reduction efficiency, given the relatively low occurrence of color noise in images.

For example, optional resampling or downsampling of pixels in the U/V channels and/or Y channel of the YUV image may be performed before constructing the guided filter using the Y-channel and performing color noise reduction in the U/V channels.

As shown in FIG. 4, diagram 410 illustrates a sample ratio of 2 in the U/V channels, in which one of every two adjacent pixel (in both row direction and column direction) in the U/V channels is sampled, along with the four surrounding pixels in the Y channel. Diagram 420 illustrates sampling adjacent pixels in the Y channel with a sample ratio of 2, which is similar to the previous resampling method except that the sampling starts in the Y channel. Diagram 430 illustrates interpolation or downsampling in the Y-channel to the same size as the U/V channel, in which every four pixels in the Y channel surrounding a pixel in the U/V channel may go through interpolation or downsample first. The interpolated pixels in the Y channel may be resampled with a sample ratio of 2, and every four of the sampled interpolated pixels may share one pixel in the U/V channel for noise reduction.

FIG. 5 illustrates an exemplary method for reducing color noise using Luminance information based guided image, according to some embodiments of this specification. The steps 510-530 illustrated in FIG. 5 are for illustration purposes. Depending on the implementation, the method 500 may include fewer, more, or alternative steps.

Step 510 may include receiving a color image. In some embodiments, the color image comprises an RGB (Red, Green, Blue) image, each pixel in the color image comprising a Red value, a Green value, and a Blue value.

Step 520 may include converting the color image into a Luminance-Chrominance color space to obtain an YUV image, wherein the YUV image comprises a Y-channel representing luminance information in the color image, and UV-channels representing chrominance information in the color image. In some embodiments, the converting the color image to obtain the YUV image may include: for a pixel in the color image, computing: a Y-channel value for the pixel based on the Red value, the Green value, and the Blue value, a U-channel value based on the Blue value and the Y-channel value, and a V-channel value based on the Red value and the Y-channel value; and obtaining the YUV image based on the Y-channel value, the U-channel value, and the V-channel value of the pixel. In some embodiments, the Y-channel value represents brightness information of the pixel, and the U-channel value and the V-channel value represent color difference signals of the pixel.

Step 530 may include constructing a guided filter based on the Y-channel of the YUV image. In some embodiments, the constructing the guided filter based on the Y-channel of the YUV image may include: constructing a guided image based on the Y-channel of the YUV image. In some embodiments, the performing color noise reduction on the UV-channels of the YUV image using the guided filter may include: defining a filtering window; for a pixel of the YUV image, computing local Y-channel statistics of the pixel based on pixel values within the filtering window centered at the pixel; and computing a pair of filtering weights for the pixel based on the local Y-channel statistics of the pixel and UV-channel values of the pixel, wherein the pair of filtering weights are used to perform color noise reduction on the UV-channels of the YUV image. In some embodiments, the pair of filtering weights comprises a first filtering weight and a second filtering weight, and the second filtering weight is a linear function of the first filtering weight.

In some embodiments, the constructing the guided image based on the Y-channel of the YUV image may include: using the Y-channel of the YUV image as the guided image.

In some embodiments, the constructing the guided image based on the Y-channel of the YUV image may include: performing brightness noise reduction on the Y-channel of the YUV image to obtain an updated Y-channel representation; and using the updated Y-channel representation as the guided image.

In some embodiments, the constructing the guided image based on the Y-channel of the YUV image may include: performing edge detection on the Y-channel of the YUV image to obtain an edge map; and using the edge map as the guided image.

In some embodiments, the method 500 may further include performing edge detection on the Y-channel of the YUV image to obtain an edge map, and wherein a first filtering weight of the pair of filtering weights comprises a color noise reduction strength parameter, and the color noise reduction strength parameter is adjustable for individual pixels based on the edge map. In some embodiments, the method 500 may further include adjusting the noise reduction strength parameter for a pixel based on whether the pixel is within a flat area or an area with an edge.

Step 540 may include performing color noise reduction on the UV-channels of the YUV image using the guided filter. In some embodiments, the performing color noise reduction on the UV-channels of the YUV image may include: obtaining filtered pixels by applying the pair of filtering weights to each pixel in the YUV image.

Step 550 may include converting the YUV image with noise-reduced UV-channels into an updated color image with reduced color noise.

Figure 6:
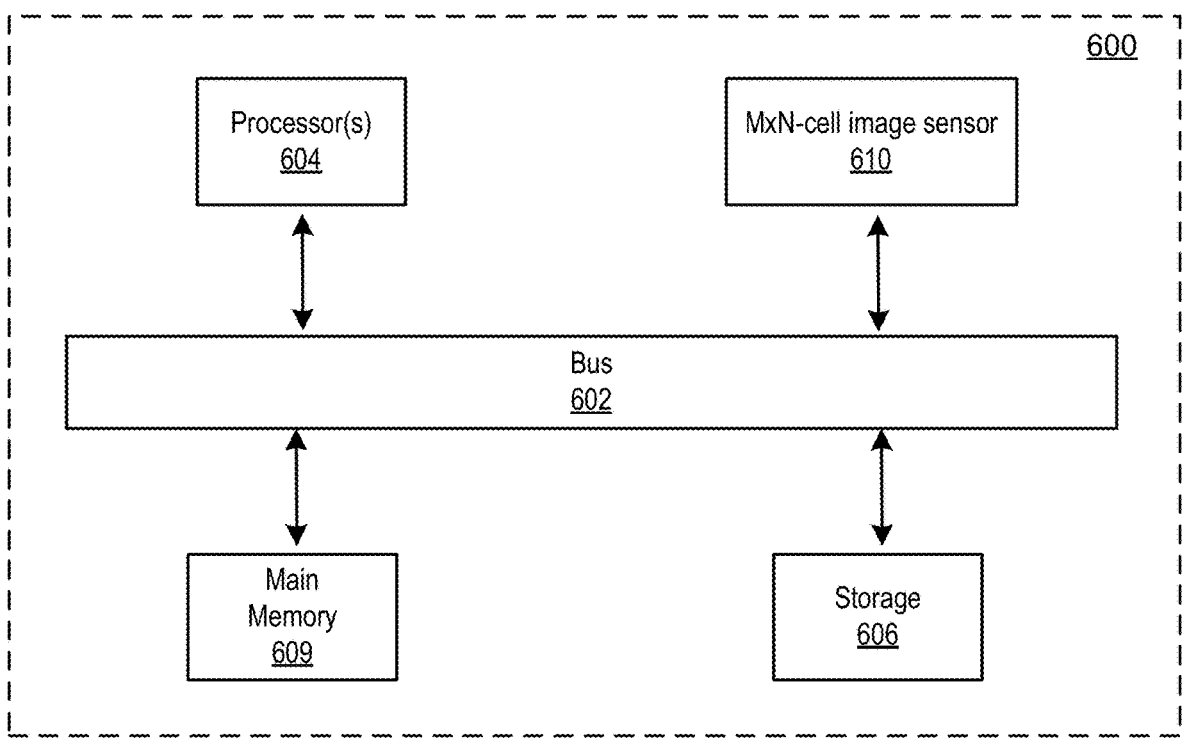
FIG. 6 is a schematic diagram of an example computing system for reducing color noise using Luminance information based guided image, according to some embodiments of this specification.

FIG. 6 is a schematic diagram of an example computing system for reducing color noise using Luminance information based guided image, according to some embodiments of this specification. The computer system 600 may be implemented in any of the components of the systems illustrated in FIGS. 1-5. One or more of the example methods illustrated by FIGS. 1-5 may be performed by one or more implementations of the computer system 600.

The computer system 600 may include a bus 602 or another communication mechanism for communicating information, and one or more hardware processor(s) 604 coupled with bus 602 for processing information. Hardware processor(s) 604 may be, for example, one or more general purpose microprocessors.

The computer system 600 may also include a main memory 609, such as a random-access memory (RAM), cache and/or other dynamic storage devices, coupled to bus 602 for storing information and instructions executable by processor(s) 604. Main memory 609 also may be used for storing temporary variables or other intermediate information during execution of instructions by processor(s) 604. Such instructions, when stored in storage media accessible to processor(s) 604, render computer system 600 into a special-purpose machine that is customized to perform the operations specified in the instructions. The computer system 600 may further include a read only memory (ROM) 609 or other static storage device coupled to bus 602 for storing static information and instructions for processor(s) 604. A storage device 606, such as a magnetic disk, optical disk, or USB thumb drive (flash drive), etc., may be provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 609. Such instructions may be read into main memory 609 from another storage medium, such as storage device 606. Execution of the sequences of instructions contained in main memory 609 may cause processor(s) 604 to perform the process steps described herein. In alternative embodiments, hard-wired circuitry may be used in place of or in combination with software instructions.

The main memory 609, the ROM 609, and/or the storage device 606 may include non-transitory storage media. The term "non-transitory media," and similar terms, as used herein refers to media that stores data and/or instructions that cause a machine to operate in a specific fashion, that excludes transitory signals. Such non-transitory media may comprise non-volatile media and/or volatile media. Non-volatile media includes, for example, optical or magnetic disks, such as storage device 606. Volatile media includes dynamic memory, such as main memory 609. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 may include a M×N-cell image sensor 610 coupled to bus 602. The M×N-cell image sensor 610 may include a plurality of pixel groups, each pixel group having a M×N pixels configured with color filters of a same color such that the M×N pixels in each pixel group capture a same color.

The computer system 600 can send messages and receive data, including program code, through the network(s), network link, and M×N-cell image sensor 610. In the Internet example, a server might transmit a requested code for an application program through the Internet, the ISP, the local network, and the M×N-cell image sensor 610.

The received code may be executed by processor(s) 604 as it is received, and/or stored in storage device 606, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
   receiving a color image;
   converting the color image into a Luminance-Chrominance color space to obtain an YUV image, wherein the YUV image comprises a Y-channel representing luminance information in the color image, and UV-channels representing chrominance information in the color image;

constructing a guided filter based on the Y-channel of the YUV image;

performing color noise reduction on the UV-channels of the YUV image using the guided filter; and converting the YUV image with noise-reduced UV-channels into an updated color image with reduced color noise, wherein:

the color image comprises an RGB (Red, Green, Blue) image, each pixel in the color image comprising a Red value, a Green value, and a Blue value, and the converting the color image into a Luminance-Chrominance color space to obtain the YUV image comprises:

for a pixel in the color image, computing:

a Y-channel value for the pixel based on the Red value, the Green value, and the Blue value, a U-channel value based on the Blue value and the Y-channel value, and a V-channel value based on the Red value and the Y-channel value; and obtaining the YUV image based on the Y-channel value, the U-channel value, and the V-channel value of the pixel.

2. The computer-implemented method of claim 1, wherein the Y-channel value represents brightness information of the pixel, and the U-channel value and the V-channel value represent color difference signals of the pixel.

3. The computer-implemented method of claim 1, wherein the constructing the guided filter based on the Y-channel of the YUV image comprises:

constructing a guided image based on the Y-channel of the YUV image; and wherein the performing color noise reduction on the UV-channels of the YUV image using the guided filter comprises:

defining a filtering window;

for a pixel of the YUV image, computing local Y-channel statistics of the pixel based on pixel values within the filtering window centered at the pixel; and computing a pair of filtering weights for the pixel based on the local Y-channel statistics of the pixel and UV-channel values of the pixel, wherein the pair of filtering weights are used to perform color noise reduction on the UV-channels of the YUV image.

4. The computer-implemented method of claim 3, wherein the pair of filtering weights comprises a first filtering weight and a second filtering weight, and the second filtering weight is a linear function of the first filtering weight.

5. The computer-implemented method of claim 3, wherein the constructing the guided image based on the Y-channel of the YUV image comprises:

using the Y-channel of the YUV image as the guided image.

6. The computer-implemented method of claim 3, wherein the constructing the guided image based on the Y-channel of the YUV image comprises:

performing brightness noise reduction on the Y-channel of the YUV image to obtain an updated Y-channel representation; and using the updated Y-channel representation as the guided image.

7. The computer-implemented method of claim 3, wherein the constructing the guided image based on the Y-channel of the YUV image comprises:

performing edge detection on the Y-channel of the YUV image to obtain an edge map; and using the edge map as the guided image.

8. The computer-implemented method of claim 3, further comprising:

performing edge detection on the Y-channel of the YUV image to obtain an edge map, and wherein a first filtering weight of the pair of filtering weights comprises a color noise reduction strength parameter, and the color noise reduction strength parameter is adjustable for individual pixels based on the edge map.

9. The computer-implemented method of claim 8, further comprising:

adjusting the noise reduction strength parameter for a pixel based on whether the pixel is within a flat area or an area with an edge.

10. The computer-implemented method of claim 3, wherein the performing color noise reduction on the UV-channels of the YUV image comprises:

obtaining filtered pixels by applying the pair of filtering weights to each pixel in the YUV image.

11. A system comprising one or more processors and one or more non-transitory computer-readable memories coupled to the one or more processors and configured with instructions executable by the one or more processors to cause the system to perform operations comprising:

receiving a color image;

converting the color image into a Luminance-Chrominance color space to obtain an YUV image, wherein the YUV image comprises a Y-channel representing luminance information in the color image, and UV-channels representing chrominance information in the color image;

constructing a guided filter based on the Y-channel of the YUV image;

performing color noise reduction on the UV-channels of the YUV image using the guided filter; and converting the YUV image with noise-reduced UV-channels into an updated color image with reduced color noise, wherein the constructing the guided filter based on the Y-channel of the YUV image comprises:

constructing a guided image based on the Y-channel of the YUV image;

wherein the performing color noise reduction on the UV-channels of the YUV image using the guided filter comprises:

defining a filtering window;

for a pixel of the YUV image, computing local Y-channel statistics of the pixel based on pixel values within the filtering window centered at the pixel; and computing a pair of filtering weights for the pixel based on the local Y-channel statistics of the pixel and UV-channel values of the pixel, wherein the pair of filtering weights are used to perform color noise reduction on the UV-channels of the YUV image.

12. The system of claim 11, wherein the pair of filtering weights comprises a first filtering weight and a second filtering weight, and the second filtering weight is a linear function of the first filtering weight.

13. The system of claim 12, wherein the constructing the guided image based on the Y-channel of the YUV image comprises:

using the Y-channel of the YUV image as the guided image.

14. The system of claim 12, wherein the constructing the guided image based on the Y-channel of the YUV image comprises:

performing brightness noise reduction on the Y-channel of the YUV image to obtain an updated Y-channel representation; and using the updated Y-channel representation as the guided image.

15. The system of claim 12, wherein the constructing the guided image based on the Y-channel of the YUV image comprises:

performing edge detection on the Y-channel of the YUV image to obtain an edge map; and using the edge map as the guided image.

16. The system of claim 12, the operations further comprising:

performing edge detection on the Y-channel of the YUV image to obtain an edge map, and wherein the first filtering weight comprises a color noise reduction strength parameter, and the color noise reduction strength parameter is adjustable for individual pixels based on the edge map.

17. A non-transitory computer-readable storage medium configured with instructions executable by one or more processors to cause the one or more processors to perform operations comprising:

receiving a color image;

converting the color image into a Luminance-Chrominance color space to obtain an YUV image, wherein the YUV image comprises a Y-channel representing luminance information in the color image, and UV-channels representing chrominance information in the color image;

constructing a guided filter based on the Y-channel of the YUV image;

performing color noise reduction on the UV-channels of the YUV image using the guided filter; and converting the YUV image with noise-reduced UV-channels into an updated color image with reduced color noise, wherein:

the color image comprises an RGB (Red, Green, Blue) image, each pixel in the color image comprising a Red value, a Green value, and a Blue value, and the converting the color image into a Luminance-Chrominance color space to obtain the YUV image comprises:

for a pixel in the color image, computing:

a Y-channel value for the pixel based on the Red value, the Green value, and the Blue value, a U-channel value based on the Blue value and the Y-channel value, and a V-channel value based on the Red value and the Y-channel value; and obtaining the YUV image based on the Y-channel value, the U-channel value, and the V-channel value of the pixel.

18. The non-transitory computer-readable storage medium of claim 17, wherein the constructing the guided filter based on the Y-channel of the YUV image comprises:

constructing a guided image based on the Y-channel of the YUV image;

wherein the performing color noise reduction on the UV-channels of the YUV image using the guided filter comprises:

defining a filtering window;

for a pixel of the YUV image, computing local Y-channel statistics of the pixel based on pixel values within the filtering window centered at the pixel; and computing a pair of filtering weights for the pixel based on the local Y-channel statistics of the pixel and UV-channel values of the pixel, wherein the pair of filtering weights are used to perform color noise reduction on the UV-channels of the YUV image.

* * * * *